United States Patent [19]
Cervenec et al.

[11] 3,830,344

[45] Aug. 20, 1974

[54] BRAKE AND CONTROL THEREFOR

[75] Inventors: Stephen William Cervenec, Perrysburg; Albert Stanford Orr, Sylvania; Richard N. Snyder, Toledo, all of Ohio

[73] Assignee: Reliance Electric Company, Euclid, Ohio

[22] Filed: Feb. 15, 1973

[21] Appl. No.: 332,704

[52] U.S. Cl. .................................. 188/171, 188/75
[51] Int. Cl. ............................................. B60t 13/74
[58] Field of Search .......... 188/156, 161, 163, 170, 188/171, 75, 106 R; 192/90

[56] References Cited
UNITED STATES PATENTS
1,577,999   3/1926   Atkinson............................. 188/171
1,991,903   2/1935   Logan............................ 188/171 X

*Primary Examiner*—Duane A. Reger
*Attorney, Agent, or Firm*—Thomas H. Grafton

[57] ABSTRACT

A spring applied, electrically released brake illustrated as applied to escalators wherein the braking apparatus applies a first braking force sufficient to provide a predetermined deceleration under no load conditions. After a time delay, a second braking force is applied which when combined with the first braking force is sufficient to provide said predetermined deceleration under full load conditions. In emergency situations, when a safety circuit is interrupted, both braking forces are applied simultaneously to produce minimum stopping time.

14 Claims, 2 Drawing Figures

PATENTED AUG 20 1974 3,830,344

BRAKE AND CONTROL THEREFOR

BACKGROUND OF THE INVENTION

1. Field of the Invention

This invention relates generally to transportation systems such as escalators and in particular, to improvements in the braking apparatus for the drive motor thereof.

2. Description of the Prior Art

In general, a passenger carrying escalator operating between a pair of landings includes a step chain comprising a series of interconnected load supporting platforms forming an endless belt driven by a drive wheel. Motive power is supplied by an electric motor and gear reduction unit which rotates the drive wheel through a belt or chain. In order to insure safe operation, the escalators are usually provided with two independent braking devices. The emergency brake operates upon the drive wheel and is only actuated if the drive belt or chain should break. Breakage of the drive belt or chain allows the loaded escalator to descend freely and this descent is arrested by actuation of the emergency brake.

In most other situations where conditions exist in which the escalator must be halted, a service brake acts upon the motor to prevent descent. Such conditions may include a power failure, shutdown at the end of operation, automatic shutdown due to an interruption in a safety circuit or automatic shutdown due to manual operation of an emergency stop button. Although these conditions dictate a rapid stop, care must be exercised to protect the passengers from injury. Therefore, except in the case of an emergency, deceleration should be smooth and gradual to avoid throwing the passengers off balance.

The escalator presents a difficult stopping problem since passengers are a significant factor in the total load to be halted. If a braking force adequate to smoothly and rapidly stop a fully loaded escalator is utilized. the same force will create a dangerously abrupt stop when there is a light load. Conversely, if a braking force adequate to smoothly and rapidly stop a lightly loaded escalator is applied, that same force will not be sufficient to stop a fully loaded escalator.

An early attempt to provide a smooth stop was by means of a mechanism disclosed in U.S. Pat. No. 1,166,679 entitled "Safety Device For Conveyors" issued to Arthur E. Handy. When a condition occurred which required the escalator to stop a spring applied, electrically released dog engaged the axle of one of the steps of the step chain. The dog was connected to a shock absorber which cushioned the descent of the escalator. However, the shock absorber had only a fixed amount of travel and a fixed resistance and therefore could not provide a smooth stop for both lightly and fully loaded escalators.

U.S. Pat. No. 2,460,017 entitled "Moving Stairway Brake" issued to G. W. Lautrup disclosed a two step brake. The service brake apparatus was mounted on the drive wheel of the step chain. The service brake comprised three spaced coaxial rings rotatable as a unit and two brake rings alternately mounted between said coaxial rings. The sides of the brake rings were faced with friction material which engaged the coaxial rings so that all the rings rotated together. The periphery of each brake ring contained teeth for engaging a pawl.

Initially, when there was a discontinuance of power to the drive motor, a first pawl engaged one of the brake rings, preventing it from rotating, and caused a braking force due to the rotation of the adjacent coaxial rings of the friction material. This braking force was sufficient to smoothly stop a lightly loaded escalator. After a predetermined period of time, a second pawl engaged the second brake ring with the result that additional braking force was supplied which was sufficient to bring a fully loaded stairway to a smooth stop. However, if the escalator was ascending at the time of the discontinuance of the power, no braking action was applied since the pawls only engaged for the down direction of rotation. Therefore, an ascending stairway must coast to a stop where the pawls engage and prevent it from descending. Such operation is undesirable where there has been an automatic shutdown due to an interruption in a safety circuit to avoid injury to a passenger. The stop must be accomplished as quickly as possible. The present invention is an improved service brake for stopping an ascending or descending escalator smoothly and rapidly under conditions from no load to full load which overcomes the above-mentioned problems.

SUMMARY OF THE INVENTION

The present invention comprises a spring actuated, electrically released service brake for a conveyor. A first spring means provides a braking force sufficient to stop a lightly loaded conveyor smoothly and rapidly. After a time delay, a second spring means provides additional braking force sufficient to stop a fully loaded conveyor.

A brake drum is attached to a drive shaft and two opposed brake shoes are applied to the drum when it is desired to stop the drive. A first solenoid holds the shoes in a released position and compresses the first and second spring means. When the first solenoid is deactivated and the first spring means is released while a second solenoid maintains the second spring means compressed. After a time delay the second solenoid is deactivated and the second spring means is released. When it is desired to decrease the stopping time, for example where there has been an interruption of a safety circuit, an alternate control circuit releases both spring means simultaneously.

BRIEF DESCRIPTION OF THE DRAWINGS

Other objects and advantages of the present invention will become readily apparent to those skilled in the art from reading the following detailed description of an embodiment of the invention when considered in the light of the accompanying drawings, in which.

DESCRIPTION OF THE PREFERRED EMBODIMENT

The present invention concerns a braking apparatus comprising a spring applied, electrically released brake and control therefore. The control is capable of simultaneously or sequentially applying two separate braking forces in response to control signals from safety and emergency stop circuits. Generally, a transportation system such as a passenger carrying escalator operating between a pair of landings is driven by an electric motor. If a condition should exist whereby the escalator must be stopped, such as a power failure, a service brake is provided to automatically stop the escalator movement and hold the escalator in position. Conditions requiring the use of a service brake may include the above-mentioned power failure, shutdown at the end of operation, automatic shutdown due to an interruption in a safety circuit or automatic shutdown due to manual operation of an emergency stop button. It is desirous that the brake provide a smooth and gradual stop to avoid throwing passengers off balance thereby causing injury. It is also desirous that the stop be made at an optimum deceleration rate so that an emergency condition is minimized. However, the various loads caused by passengers require different braking forces in order to stop in the aforesaid manner. The present invention overcomes these problems by utilizing a two stage service brake. Separate braking forces may be applied simultaneously or sequentially as required.

Figure 1:
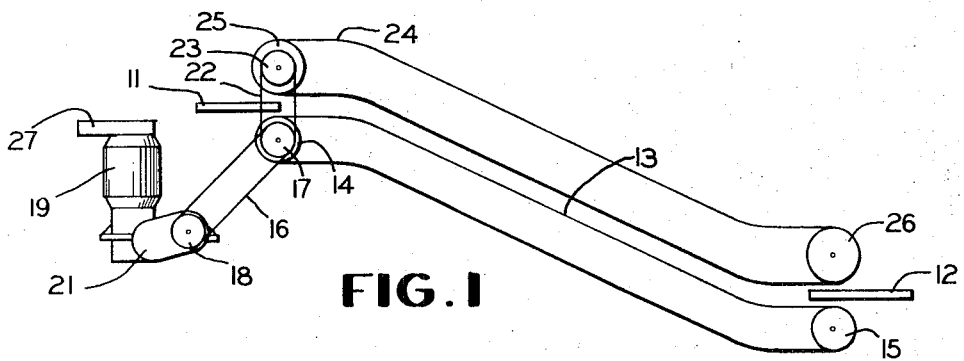
FIG. 1 is a schematic view of an escalator system according to the present invention.

Referring to FIG. 1, there is shown an escalator system of the type utilizing the present invention. Passengers are transported between upper landing 11 and lower landing 12 on an inclined chain of interlocking steps. The step chain is driven by an electric motor through a gear reduction unit to reduce the drive speed and may be run in either a descending or ascending direction. When there is a system shutdown, the motor is turned off and any load on the step chain, such as passengers, will cause the step chain to descend. In order to stop movement of the escalator a service brake may be utilized, for example, on the armature shaft of the motor, to decelerate and hold the step chain in position.

The escalator of FIG. 1 includes a step chain 13 comprised of a series of interlocked steps formed into an endless belt. Step chain 13 is driven by drive wheel 14 and is returned at its opposite end by guide wheel 15. The drive wheel 14 is driven through a flexible roller chain 16 which engages teeth on step chain sprocket 17 coaxial with and attached to drive wheel 14. Roller chain 16 also engages teeth formed on the periphery of drive sprocket 18 which is driven by electric motor 19. The speed of electric motor 19 is reduced by driving sprocket 18 through a gear reduction unit 21.

Step chain sprocket 17 also has a second set of teeth which drive roller chain 22. Handrail sprocket 23 also engages chain 22 so that electric motor 19 drives sprocket 23. Handrail 24 is driven by handrail drive wheel 25 which is coaxial with and attached to handrail sprocket 23. Handrail 24 is also formed as an endless belt and is returned from lower landing 12 by handrail guide wheel 26. The ratio of the diameters of step chain sprocket 17 and handrail sprocket 23 is such that corresponding points on step cahin 13 and handrail 24 move at the same speed.

Figure 2:
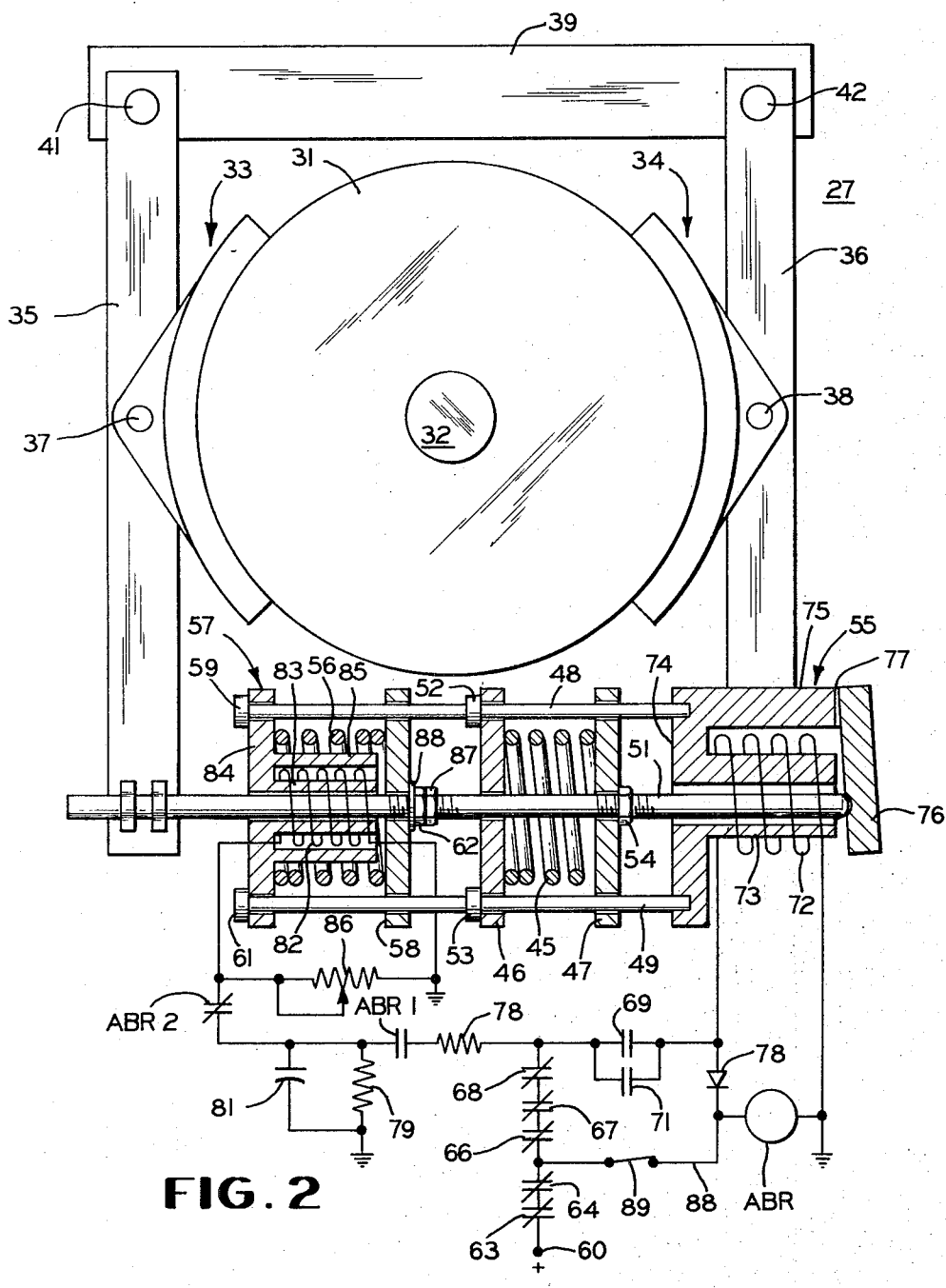
FIG. 2 is a top plan view of a brake incorporating the present invention in partial section including a schematic of the electrical circuit controlling its operation.

Service brake assembly 27 is mounted on electric motor 19 and is attached to the armature shaft at the end opposite that to which gear reduction unit 21 is attached. Referring to FIG. 2, there is shown a top plan view in partial section of the mechanical components and a schematic of the electrical components of service brake assembly 27. When it is desired to stop the escalator, a pair of opposed brake shoes are brought into contact with a brake drum which is coaxial with and attached to the motor armature shaft. The brake shoes are spring applied so that a constant braking force is achieved. In the illustrative embodiment of the present invention, there is a primary spring which applies a braking force sufficient to stop a lightly loaded escalator at a predetermined deceleration rate. During the two stage mode of operation, after a time delay, a secondary spring applies additional braking force and the combination is sufficient to stop a fully loaded escalator.

The brake force application springs are held in a compressed state by a primary solenoid so that the brake shoes are not in contact with the brake drum. When the power to the motor is disconnected, during one of the above-mentioned conditions, the primary solenoid is deactivated and the primary application spring causes the brake shoes to be applied to the brake drum with the initial braking force. During the operation of the escalator a capacitor was kept fully charged. When the first solenoid is deactivated, the capacitor is connected to the winding of a secondary solenoid thereby activating it. This secondary solenoid maintains the secondary spring compressed until the capacitor has discharged. The resistance of the discharge path determines the time delay for the release of the secondary spring and application of the second braking force. The discharge of the capacitor deactivates the secondary solenoid and the secondary application spring supplies additional braking force to the brake shoes. If the initial braking force was not sufficient to stop the escalator, the second braking force will cause it to stop even if it is fully loaded.

In FIG. 2, brake drum 31 is attached to the drive shaft 32 of electric motor 19. A pair of opposed brake shoes 33 and 34 are pivotally attached to brake levers 35 and 36 at pivot points 37 and 38. Brake levers 35 and 36 are pivotally attached to brake support bar 39 at pivot points 41 and 42. Brake support bar 39 is firmly affixed to the case of electric motor 19 through the brake assembly housing which is not shown. As brake levers 35 and 36 are pivoted outwardly from armature shaft 32, brake shoes 33 and 34 are released from contact with brake drum 31.

Both the primary and the secondary springs are axially positioned between the free ends of the brake levers. Each spring is compressed between a pair of plates each of which is attached to the brake lever at the opposite end of the spring. Therefore, as the spring forces the plates apart the brake levers are drawn toward the brake drum.

In FIG. 2, the brake is shown with its electromagnetic release circuit disengaged. Primary spring 45 is constrained between plates 46 and 47. Plates 46 and 47 are sildably mounted on retaining rods 48 and 49 and adjusting rod 51. Expanded spring 45 forces plates 46 and 47 apart. However, although plate 46 is free to move along rod 51, retaining rings 52 and 53 fixed axially on rods 48 and 49 limit its movement along rods 48 and 49 in a direction away from plate 47. In a similar manner, nut 54 limits movement of plate 47 along rod 51 in a direction away from plate 46 while it is free to move along rods 48 and 49. Therefore, as plates 46 and 47 are forced apart, rods 48 and 49 move to the left with plate 46, viewed in FIG. 2, and rod 51 moves to the right with plate 47. One end of rod 51 is attached to brake lever 35 while the ends of rods 48 and 49 are attached to brake lever 36 through primary solenoid core 55. As primary spring 45 expands, the movement of plates 46 and 47 and rods 48, 49 and 51 rotate brake levers 35 and 36 toward armature shaft 32 until brake shoes 33 and 34 are applied to brake drum 31.

Secondary spring 56 applies additional braking force in a manner similar to primary spring 45. Spring 56 is constrained between a flange on secondary solenoid core 57 and plate 58 which are slidably mounted on rods 48, 49 and 51. However, core 57 is limited in its motion along rods 48 and 49 in a direction away from plate 58 by heads 59 and 61 formed on the ends of retaining rods 48 and 49. Similarly, plate 58 is limited in its motion along rod 51 in a direction away from core 57 by nut 62. Therefore, as spring 56 expands, core 57 and plate 58 are forced apart. Rods 48 and 49 will move to the left with core 57 and rod 51 will move to the right with plate 58 rotating brake levers 35 and 36 toward armature shaft 32 to apply additional braking force to brake drum 31 through brake shoes 33 and 34.

The brakes are electrically released by the primary solenoid 72 which forces relative motion of rod 51 to the left and rods 48 and 49 to the right to compress springs 45 and 56 thereby rotating brake levers 35 and 36 outwardly from armature shaft 32. The coil of the primary solenoid is supplied with current through a series connection of relay contacts which are closed when the escalator is in operation. If there is an interruption in a safety circuit or the manual operation of an emergency stop button, one of the contacts will be opened to deactivate the primary solenoid and allow the primary spring to apply the brake.

The secondary spring is supplied with a secondary solenoid which has sufficient force to prevent the spring from expanding but cannot return the spring to a compressed state from the expanded position. The secondary solenoid is only activated upon initiation of a stop. Under emergency stop conditions, it is desired to stop the escalator as quickly as possible. Therefore, when the primary solenoid is deactivated, both the primary and secondary springs are released. When normal service stop is undertaken the primary solenoid is deactivated and the secondary solenoid is activated. This releases the primary spring while holding the secondary spring. After a time delay, the secondary solenoid is deactivated releasing the secondary spring.

Current from a power source passes through the series of closed contacts for the stop switches and safety circuits to the coil of the primary solenoid. In addition, the current also charges a capacitor. The coil for the relay which controls the contacts in the secondary solenoid circuit is supplied with current from a point between the stop contacts and the safety circuit contacts. Therefore, if a safety circuit is interrupted only the current to the primary solenoid coil is disconnected while the secondary solenoid relay remains energized. This prevents the secondary solenoid from being activated and both springs are released.

If the system loses power or is subjected to a normal stop, both the primary solenoid and the relay are deactivated. This closes a contact which allows the capacitor to discharge into the secondary solenoid coil, thereby activating it. The time of activation is determined by the resistance of the discharge path, the value of capacitance, the voltage on the capacitor and the holding voltage of the secondary solenoid coil. When the capacitor has discharged to a point where the solenoid is no longer activated the secondary spring is released.

In FIG. 2, normally closed stop contacts 63 and 64 are controlled from locations convenient to the conveyor such as at upper landing 11 for contacts 63 while the contacts 64 may be controlled at lower landing 12. Generally, each stop contact can be latched open when actuated by a stop signal as through a stop relay (not shown). Both contacts 63 and 64 are closed when power is applied between ground and terminal 60 to place the escalator in operation. Current passes through contacts 63 and 64 and auxiliary brake relay ABR to ground. Relay ABR closes contacts ABR1 in the secondary solenoid circuit to charge capacitor 81 and opens back contacts ABR2 to prevent energization of the secondary solenoid while the escalator is running.

Safety contacts 66, 67 and 68 form the current path for the primary solenoid and capacitor. These contacts, which represent conventional safety switches such as an overspeed switch, a combplate switch and slack step chain switch, are closed during the normal operation of the escalator. Current from the power source now flows to the primary solenoid coil 72 through either up direction contact 69 or down direction contact 71. One of these direction contacts will be closed depending upon whether the escalator is ascending or descending. The electrical circuit is completed through coil 72 to ground. During normal operation of the escalator, current is flowing through coil 72 to activate the primary solenoid. A primary solenoid magnetic circuit includes the ferromagnetic core 55 having a winding leg 73 on which the winding 72 is carried, an end 74 and a return leg 75 all of low reluctance. A ferromagnetic clapper 76 completes the flux path between legs 73 and 75 when the clapper is drawn clockwise to leg 73 around its mounting fulcrum 77. The magnetic field produced by the current flowing through coil 72 pulls the clapper 76 toward core 55 to force rod 51 to the left while a reaction on the brake arm mounted core 55 moves rods 48 and 49 to the right. The relative movement of arm 51 and rods 48 and 49 causes springs 45 and 57 to be compressed and releases the brake.

Upon energization of coil 72 current flows through relay ABR and contacts ABR1 are closed. Current from the power source at 60 passes through the circuit comprising contacts 63, 64, 66, 67 and 68, resistor 78, contacts ABR1 and the parallel combination of resistor 79 and capacitor 81 to ground. This current path maintains capacitor 81 charged to a voltage determined by the ratio of the value of resistor 79 to the total path resistance. At this time open back contacts ABR2 prevent energization of secondary brake coil 82. If power is removed as by opening a stop contact for example contacts 63 in FIG. 2, current is no longer supplied to coil 72 from terminal 60 and the magnetic field in primary solenoid collapses over a discrete time interval of the order of one-quarter second. When the flux in the primary magnetic circuit has decayed to a level which is overcome by the force of spring 45, plates 46 and 47 are displaced apart and clapper 76 is released to apply the first braking force.

At the time power was removed, current ceased flowing through relay ABR so that contacts ABR1 open and contacts ABR2 close. The charge on capacitor 81 supplied current to secondary solenoid coil 82. Flux builds up in the secondary magnetic circuit including ferromagnetic core 57 and reciprocating ferromagnetic armature plate 58, by flowing from the central leg 83, the end plate 84 and the return legs 85 of core 57. At this time the primary spring 45 has not yet overcome the decaying flux of the primary magnetic circuit of core 55 so the armature plate 58 abuts core legs 83 and 85 and a low reluctance secondary path is available. The secondary flux builds to a level sufficient to overcome the force of secondary spring 56 before spring 45 overcomes the primary solenoid flux and displaces rod 51 to the right. Thus when nut 62 moves with rod 51 on which it is threaded it separates from armature plate 58. The magnetic field produced by coil 82 holds plate 58 against core 57 to hold spring 56 compressed.

Capacitor 81 discharges with a time constant determined by the combination of values of resistance of resistor 79, contacts ABR2, coil 82 and potentiometer 86. This resistance is controlled in the main by potentiometer 86 and in practice is adjustable from a period of zero delay following the displacement of rod 51 to a delay of 4 seconds following that displacement. When capacitor 81 has discharged sufficiently and the flux in core 57 has collapsed to a level insufficient to overcome the force of spring 56, plate 58 is displaced toward nut 62 to supply additional braking force through rods 48 and 49 and rod 51. Plate 58 has sufficient travel under the impetus of spring 56 to impose a substantial impact on nut 62. This impact tends to cause nut 62 to creep and the adjustment of effective brake force established by its distance from the seat of spring 56 against end plate 84 to be altered. Accordingly, locknut 87 is provided on rod 51 so that it can be jammed in locking condition against nut 62. Nut 54 does not have to be retained by a locknut since spring 45 maintains constant pressure on it through plate 47 to prevent rotation. Brass plate 88 acts as a magnetic barrier to militate against the magnetic attraction of the plate to nut 62 due to the secondary solenoid flux and thereby enhance the release characteristics of the secondary solenoid.

If instead of contacts 63 or 64 opening, to simultaneously deenergize relay ABR and coil 72, a safety circuit is interrupted, as where one of the contacts 66, 67 or 68 is opened to disconnect coil 72 from the power source both brake applying springs 45 and 56 are effective simultaneously. When the magnetic field of coil 72 has collapsed, spring 45 is released to apply the initial braking force to brake drum 31. Relay ABR continues to be supplied with current through contacts 63 and 64, therefore, contacts ABR2 remain open, solenoid 82 remains deenergized, and spring 56 is also released to apply the additional braking force. Since the opening of one of the contacts 66, 67 or 68 disconnects capacitor 81 from the power supply, the capacitor will discharge through resistors 78 and 79. The value of resistor 78 reduces the level of current flowing through coil 72 below that required to activate the primary solenoid.

After the condition requiring shutdown has been corrected, contacts 63, 64, 66, 67 and 68 are closed and current is supplied to relay 65 and primary solenoid coil 72. The magnetic field produced by coil 72 attracts clapper 76 to solenoid core 55 thereby forcing rod 51 toward brake lever 35. The movement of rod 51 relative to rods 48 and 49 compresses springs 45 and 56 while releasing brake shoes 33 and 34. Contacts ABR1 close and contacts ABR2 open to provide a charging path for capacitor 81 and condition the control circuit for the next brake application.

The present invention is a spring applied, electrically released brake for transportation system, such as an escalator, which supplies braking force sufficient to halt an escalator quickly and smoothly under light and full load conditions in both the ascending and descending directions. A primary spring applies an initial braking force sufficient to stop a lightly loaded escalator. A secondary spring applies additional braking force to stop a fully loaded escalator. Control signals actuate a control circuit capable of releasing the primary and secondary springs simultaneously or sequentially with a predetermined time delay.

In some utilizations it is desirable to apply the braking force sequentially under all stopping conditions including emergencies. Under such circumstances relay ABR is connected behind the safety and directional contacts 66, 67, 68, 69 and 71 by opening lead 88 at switch 89. Rectifier 78 is retained to prevent the back emf of the main brake coil repicking relay ABR as the solenoid field collapses.

It is to be appreciated that the sequenced electromagnetic brake spring release of this invention can be utilized in structures other than moving stairways. For example, the brake control lends itself to elevator utilization particularly as applied to geared traction machines.

The brake actuator of this invention can be considered as a combination of a drive link, the rod 51, which can operate with respect to a fixed element as well as with respect to the relatively movable solenoid core 55. Thus, the first biasing means, spring 45, operates upon rod 51 alone or, in opposition as shown against rod 51 and rods 48 and 49. Similarly the second biasing means, spring 56, can operate on a single or double movable link. In either form of brake actuator solenoid 72 is means for displacing the link from the brake setting to the brake releasing condition and solenoid 82 constitutes means for maintaining the second biasing means in the brake releasing condition. The brake release controls release solenoid 72 thereby imposing the first spring brake setting bias on link 51 through plate 47. Plate 58 imposes the second bias on the link 51 by virtue of the freedom of the link to move longitudinally through the plate even to the initial brake setting condition. Alternative mechanical arrangements of the biasing means, drive links, bias constraints and controls can be made within the spirit of this invention.

From the above description, it is evident that the invention may be practiced otherwise than as specifically illustrated and described. Accordingly, it is to be understood that the above disclosure is to be read as illustrative of the invention and not in a limiting sense.

What we claim:

1. A braking apparatus including a brake actuator comprising a mechanical link for establishing braking and non-braking conditions in said braking apparatus, first means for biasing said link with a first braking force, second means for biasing said link with a second braking force, first means for connecting said first biasing means to said link; second means for connecting said second biasing means to said link and control means for controlling the displacement of said link so that said first and second biasing means apply said first and second breaking forces to said link at successive times under normal stop conditions and so that said first and said second biasing means apply said first and said second braking forces to said link at the same time under emergency stop conditions.

2. A braking apparatus according to claim 1 wherein said first biasing means includes a spring.

3. A braking apparatus according to claim 1 wherein said second biasing means includes a spring.

4. A braking apparatus according to claim 1 wherein said second means for connecting said second biasing means to said link includes a member upon which said second biasing means inposes said second braking force and which is movable with respect to said link and a limit on said link for limiting the movement of said member with respect to said link in the direction of said second braking force.

5. A braking apparatus as set forth in claim 1 wherein said control means includes a first solenoid for displacing said link to overcome said biasing means and establish said non-braking condition and for releasing said link to release said biasing means and establish said braking condition.

6. A braking apparatus as set forth in claim 5 wherein said control means includes a second solenoid for delaying the release of said second biasing means for a predetermined time after said firt solenoid releases said link under normal stop conditions.

7. A braking apparatus as set forth in claim 6 wherein said control means includes circuitry for preventing said second solenoid from delaying the release of said second biasing means under emergency stop conditions.

8. A braking apparatus as set forth in claim 1 wherein said control means includes means for displacing said link to establish said non-braking condition and maintaining means for preventing said second biasing means from applying said second braking force to said link.

9. A braking apparatus comprising a brake drum; a brake lever; a brake shoe attached to said brake lever; first application means for applying a first braking force to said brake lever; first release means for actuating said first application means; second application means for applying a second braking force to said brake lever; second release means for actuating said second application means; and control means for actuating said first and said second application means at successive times under normal stop conditions and for actuating said first and said second application means at the same time under emergency stop conditions.

10. A braking apparatus according to claim 9 wherein said control means includes time delay means for delaying actuation of said second release means under normal stop conditions.

11. A braking apparatus according to claim 8 wherein said mechanical link is a rod movable generally longitudinally between positions defining the braking and non-braking conditions, said first and second biasing means comprise respective first and second springs, said displacing means and said maintaining means comprise respective first and second solenoids, and said second means for connecting said second biasing means to said link is a member movable with respect to said link rod and a limit on said link for limiting the movement of said member with respect to said link in the biasing direction of said second biasing means.

12. A braking apparatus according to claim 11 wherein said second solenoid is generally coaxial with said rod, said member is an armature for said second solenoid movable longitudinally on said rod, and said second spring is maintained under compression by said armature.

13. A braking apparatus according to claim 12 wherein said second solenoid has a core in which sufficient flux is developed to maintain said armature against said core in opposition to said second spring.

14. A braking apparatus comprising a brake drum, a brake support, first and second brake levers pivotally mounted on said brake support for inward and outward movement in relation to said drum, first and second brake shoes mounted on said first and second brake levers between said levers and said drum, a first solenoid having a first core and a first armature, said first core being fixedly attached to said first brake lever, a mechanical link having one end thereof fixedly attached to said second lever and having the other end thereof in contact with said first armature for inward and outward movement therewith, a plurality of elongated guide members fixedly attached to said first brake lever and having axes substantially parallel to said link, a second solenoid having a second core and a second armature, first and second link stops for limiting longitudinal movement along said link, first and second sets of guide steps for limiting longitudinal movement along said guide members, a first set of plates slidably mounted on said link and said guide members between said first link stop and said first set of guide stops, a first spring located between said first set of plates, said second core and said second armature being slidably mounted on said link and said guide members between said second link stop and said second set of guide stops, a second spring located between said second core and said second armature, a first coil for energizing said first core to compress said first and second springs when tHe braking apparatus is in a non-braking condition and to release at least one of said springs when the braking apparatus is in a braking condition, and a second coil for enegizing and de-energizing said second core to control the release of said second spring.

* * * * *